US006452781B1

(12) United States Patent
Ahiko et al.

(10) Patent No.: US 6,452,781 B1
(45) Date of Patent: Sep. 17, 2002

(54) MULTILAYER ELECTRONIC DEVICE

(75) Inventors: Taisuke Ahiko; Masaaki Togashi; Sunao Masuda, all of Akita-ken (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 09/969,643

(22) Filed: Oct. 4, 2001

(30) Foreign Application Priority Data

Oct. 6, 2000 (JP) ....................................... 2000-307097

(51) Int. Cl.[7] .................................................. H01G 4/06

(52) U.S. Cl. ................................ 361/321.2; 361/306.1; 361/313; 361/310; 361/309; 361/308.1; 361/306.3; 257/700; 257/701; 257/758; 257/703

(58) Field of Search ................................. 257/758, 700, 257/701, 774, 773, 703, 705, 698, 693, 692; 361/321.2, 306.3, 308.1, 309, 310, 313, 306.1

(56) References Cited

U.S. PATENT DOCUMENTS

| | | | | |
|---|---|---|---|---|
| 5,386,339 A | * | 1/1995 | Polinski, Sr. | 174/252 |
| 5,402,003 A | * | 3/1995 | McIver et al. | 257/668 |
| 5,521,332 A | * | 5/1996 | Shikata et al. | 174/52.4 |
| 5,798,563 A | * | 8/1998 | Feilchenfeld et al. | 174/255 |
| 5,880,925 A | | 3/1999 | DuPre et al. | |
| 6,222,262 B1 | * | 4/2001 | Ueno et al. | 252/521.1 |
| 6,292,351 B1 | | 9/2001 | Ahiko et al. | |
| 6,353,189 B1 | * | 3/2002 | Shimada et al. | 174/255 |
| 6,370,010 B1 | * | 4/2002 | Kuroda et al. | 361/303 |

FOREIGN PATENT DOCUMENTS

JP 11-144996 A 5/1999

OTHER PUBLICATIONS

U.S. patent application Ser. No. 09/611,311, filed Jul. 6, 2000, Ahiko et al.

U.S. patent application Ser. No. 09/612,369,, filed Jul. 7, 2000, Togashi et al.

U.S. patent application Ser. No. 09/612,524, filed Jul. 6, 2000, Ahiko et al.

* cited by examiner

*Primary Examiner*—Nathan J. Flynn
*Assistant Examiner*—Pershelle Greene
(74) *Attorney, Agent, or Firm*—Oliff & Berridge, PLC

(57) ABSTRACT

The multilayer electronic device comprises a dielectric body formed by stacking dielectric layers. Flat first internal electrodes and flat second internal electrodes insulated via dielectric layers and arranged facing to the first internal electrodes are alternately stacked. First through-hole electrodes are connected to the first internal electrodes by penetrating, penetrate the second internal electrodes without connecting thereto and extend crossing the internal electrodes. The second through-hole electrodes are connected to the second internal electrodes by penetrating, penetrate the first internal electrodes without connecting thereto and extend crossing the internal electrodes. The first terminal electrodes are arranged on the outer surface of the dielectric body and connected to the first through-hole electrodes. The second terminal electrodes are arranged on the outer surface of the dielectric body, arranged alternately with the first terminal electrodes and connected to the second through-hole electrodes.

8 Claims, 11 Drawing Sheets

10
12
12A
12B
12C
14
16
18
20
22
22A
24
24A 10
12
12A
12B
12C
14
16
18
20
22
22A
24
24A
Y
Z 10
12
14
16
18
20
22
24
34
X
Y
Z 12B
22
18
22A
22A
10a
14
14
12
12A
12C
12C
16
16
20
24A
24A
24
12B 12A
18
14
20
16
34

12A
18
14
16
20
34

MULTILAYER ELECTRONIC DEVICE

BACKGROUND OF THE INVENTION

1. Field of the Invention

The present invention relates to a multilayer electronic device for reducing an equivalent serial inductance (ESL) able to be used also as a capacitor array, particularly relates to a multiterminal multilayer capacitor.

2. Description of the Related Art

A capacitor is widely known as one kind of electronic devices. Along with CPUs and other devices becoming to have a higher frequency in recent years, multilayer ceramic chip capacitors having a small ESL have also come into use. As a multiterminal capacitor of the related art having a small ESL, those in the Japanese Unexamined Patent Publications No. 9-17693 and No. 11-144996 and the US Patent Publication U.S. Pat. No. 5,880,925 are known.

The multiterminal multilayer capacitors of the related art described in the publications are originally designed to have a capacitance, however, due to the configurations, they inevitably have parasitic inductance and that leads to an existence of equivalent serial inductance. Because an operation frequency becomes higher as an operation of an CPU becomes high speed in recent years, multiterminal multilayer capacitors having been used without any problems result in having too large parasitic inductance in some cases.

SUMMARY OF THE INVENTION

The present invention was made in consideration with the above circumstances and has as an object thereof to provide a multiterminal multilayer capacitor and other multilayer electronic devices capable of reducing equivalent serial inductance.

To attain the above object, according to a first aspect of the present invention, there is provided a multilayer electronic device, comprising:

a dielectric body formed by stacking dielectric layers;

a flat first internal electrode arranged in the dielectric body;

a flat second internal electrode arranged opposing to the first internal electrode and insulated via the dielectric layer in the dielectric body;

a first through-hole electrode connected to the first internal electrode by penetrating, penetrating the second internal electrode without connecting thereto and extending across these internal electrodes;

a second through-hole electrode connected to the second internal electrode.by penetrating, penetrating the first internal electrode without connecting thereto and extending across these internal electrodes;

a first terminal electrode arranged on an outer surface of the dielectric body and connected to the first through-hole electrode; and a second terminal electrode arranged on the outer surface of the dielectric body and connected to the second through-hole electrode.

According to the multilayer electronic device of the present invention, two kinds of first and second through-hole electrodes alternately become anodes and cathodes when a current flows, and two kinds of first and second internal electrodes function as electrodes of a capacitor. Accordingly, magnetic flux generated by high frequency currents flowing inversely to each other in the two kinds of first and second through-hole electrodes cancels each other in the multilayer electronic device and is nullified. As a result, parasitic inductance in the multilayer electronic device itself is reduced, and thereby, equivalent serial inductance is reduced.

Also, in the present invention, since the internal electrodes and terminal electrodes are connected via the first and second through-hole electrodes in a pillar shape wherein the end portion has a large area, connection becomes firm between the first and second through-hole electrodes and the first and second terminal electrodes, and equivalent serial resistance (ESR) becomes low.

Preferably, a plurality of the first internal electrodes and a plurality of the second internal electrodes are respectively formed in the dielectric body; and the first internal electrodes and the second internal electrodes are alternately arranged in the dielectric body.

In the case where a plurality of the first internal electrodes and a plurality of the second internal electrodes are formed and alternately arranged in the dielectric body as explained above, a high capacitance can be obtained when the multilayer electronic device is applied as a capacitor.

Preferably, a plurality of first through-hole electrodes and a plurality of second through-hole electrodes are formed in the dielectric body and the first through-hole electrodes and the second through-hole electrodes are arranged next to each other.

As explained above, when the first through-hole electrodes connected to the first internal electrodes and the second through-hole electrodes connected to the second internal electrodes are arranged next to each other in the dielectric body, an effect that magnetic flux cancels each other further improves due to high frequency currents flowing inversely to each other.

Preferably, each of the plurality of first through-hole electrodes is connected to all of the first internal electrodes arranged in the dielectric body and each of the plurality of second through-hole electrodes is connected to all of the second internal electrodes arranged in the dielectric body.

In this case, a connection area of the respective through-hole electrodes and respective internal electrodes increases.

Alternately, in the present invention, at least one of the plurality of first internal electrodes arranged in the dielectric body is not connected to at least one of the plurality of the first through-hole electrodes; and at least one of the plurality of second internal electrodes arranged in the dielectric body is not connected to at least one of the plurality of the second through-hole electrodes.

In this case, alternately, the plurality of first internal electrodes arranged in the dielectric body have less connection points with the plurality of first through-hole electrodes on both end sides along the stacking direction of the dielectric layers and more connection points at the center portion; and the plurality of second internal electrodes arranged in the dielectric body have less connection points with the plurality of second through-hole electrodes on both end sides along the stacking direction of the dielectric layers and more connection points at the center portion.

By changing the number of connection points of the through-hole electrodes connected to the internal electrodes in this way, the effect of magnetic flux cancellation can be furthermore expected and the parasitic induction further reduced, because the number of current fluxes alternately flowing in the direction of the thickness is increased.

Preferably, the dielectric body is formed to be a hexagonal shape;

at least two opposite sides of the dielectric body in the hexagonal shape are provided with base parts of the first and second terminal electrodes in the way of extending in parallel respectively with the first and second through-hole electrodes; and the first and second terminal electrodes are connected respectively to the first and second through-hole electrodes at terminal pad portions bent at a right angle from the base parts of the first and second terminal electrodes.

When flowing high frequency currents to the terminal electrodes, as two kinds of internal electrodes connected to the terminal electrodes via the through-hole electrodes become anodes and cathodes, currents from the terminal electrodes on two sides mutually inversely flow to the internal electrodes, which brings an effect of reducing parasitic inductance.

Preferably, the first terminal electrodes connected respectively to the first through-hole electrodes and the second terminal electrodes connected to the second internal electrodes are arranged next to each other on the outer surface of the dielectric body.

In this case, since the currents flow so that polarities of adjacent terminal electrodes become different to each other, the effect of magnetic flux cancellation furthermore improves due to the high frequency currents flowing in the inversed directions to each other.

BRIEF DESCRIPTION OF THE DRAWINGS

Below, a multilayer electronic device according to the present invention will be explained in detail based on the drawings, in which.

DESCRIPTION OF THE PREFERRED EMBODIMENTS (First Embodiment)

As shown in FIG. 1 to FIG. 4, a multiterminal multilayer capacitor 10 as a multilayer electronic device according to a first embodiment of the present invention comprises a dielectric body 12. The dielectric body 12 is a rectangular parallelepiped sintered body obtained by stacking a plurality of ceramic green sheets for making dielectric layers and firing the stacked body.

Figure 4:
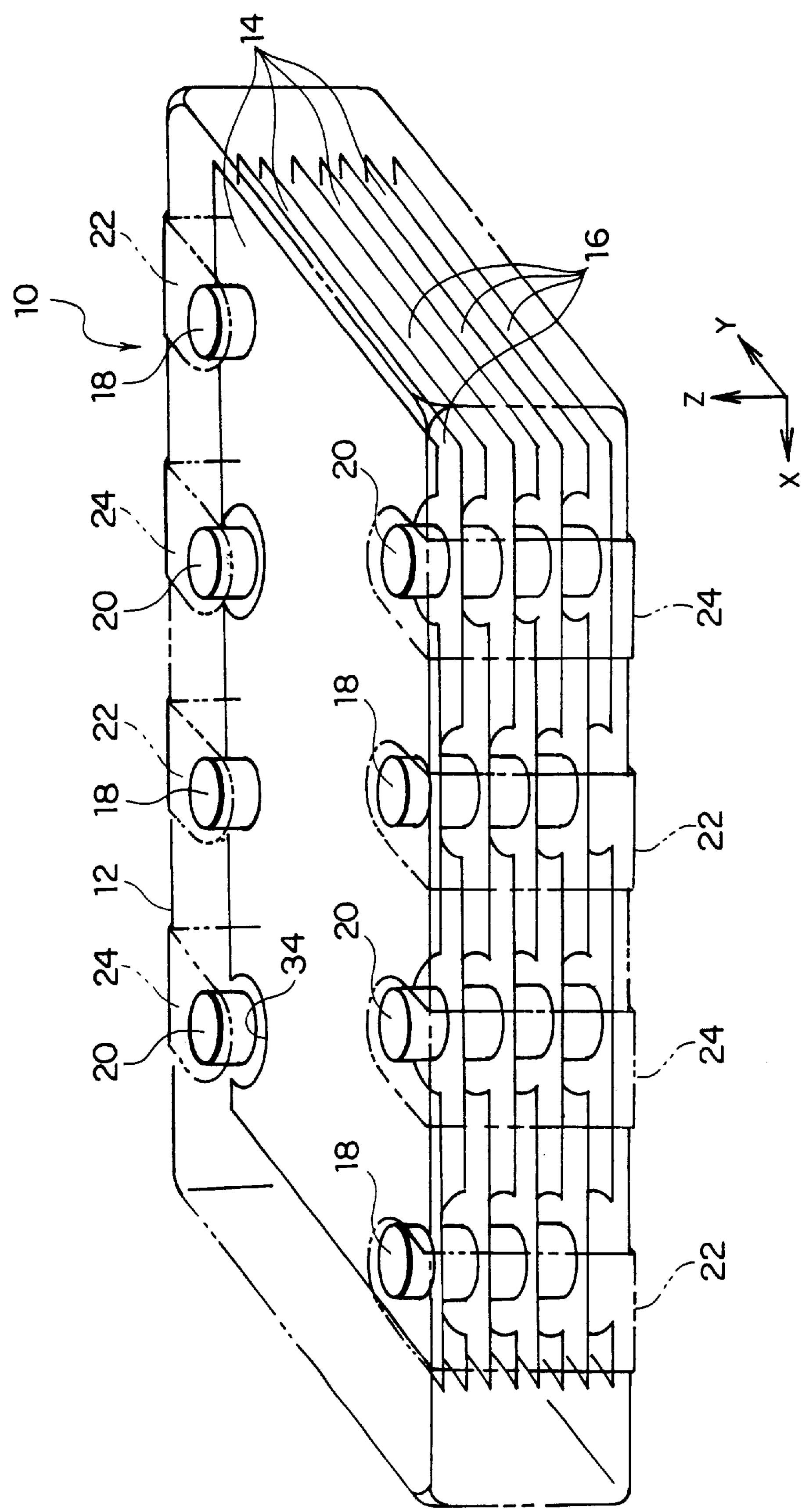
FIG. 4 is a perspective view within the multiterminal multilayer capacitor shown in FIG. 1.
Figure 5A:
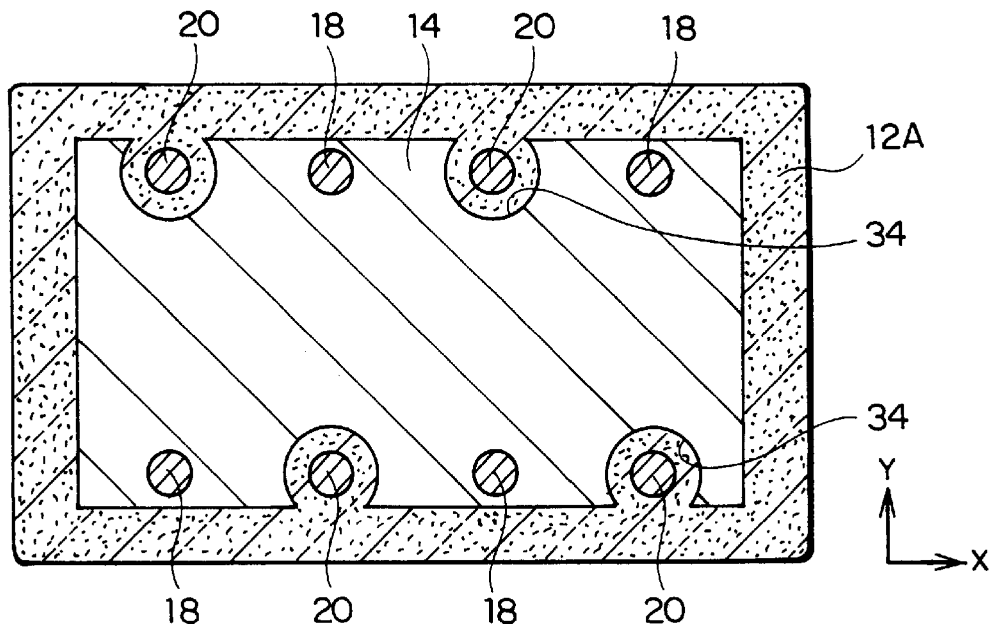
FIG. 5A is a sectional view of a pattern of a first internal electrode in the multiterminal multilayer capacitor shown in FIG. 1.
Figure 5B:
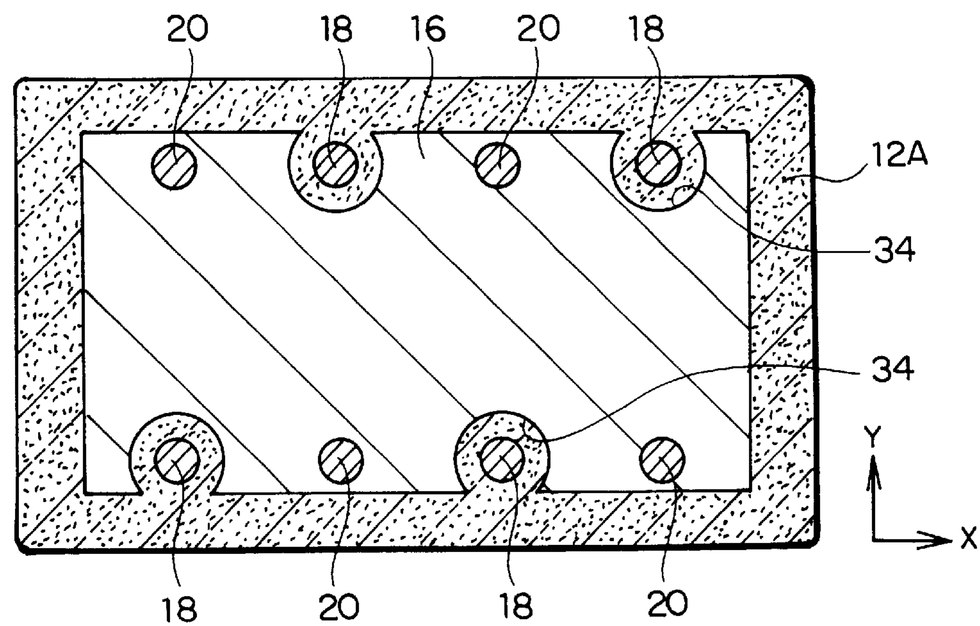
FIG. 5B is a sectional view of a pattern of a second internal electrode in the multiterminal multilayer capacitor shown in FIG. 1.

Inside the dielectric body 12, flat first internal electrodes 14 shown in FIG. 5A and flat second internal electrodes 16 shown in FIG. 5B are insulated by respective ceramic layers 12A and alternately stacked in a Z-axis direction. In the illustrated example, respective four of the first and second internal electrodes 14 and 16 exist in the dielectric body 12 by being respectively separated by the ceramic layers 12A as shown in FIG. 4. Accordingly, the first internal electrodes 14 and the second internal electrodes 16 are arranged facing to each other via the ceramic layers 12A while being insulated in the dielectric body 12.

The center of the X-Y plane of the first internal electrodes 14 and the second internal electrodes 16 positions almost the same position as a center of the X-Y plane of the dielectric body 12. Also, a length and width of the first internal electrodes 14 and the second internal electrodes 16 are designed to be a little shorter than corresponding lengths of sides of the dielectric body 12 in the X direction and Y direction. Therefore, outer circumferential edge portions of the first internal electrodes 14 and the second internal electrodes 16 have the configuration designed not to be exposed to end portions of the dielectric body 12.

In the dielectric body 12, a first through-hole electrode 18 and a second through-hole electrode 20 are alternately arranged along the longitudinal X direction at the both sides of the Y direction which is a direction of short sides of the first internal electrodes 14 and the second internal electrodes 16. The through-hole electrodes 18 and 20 extend in a pillar shape in the Z direction so as to cross and penetrate the internal electrodes 14 and 16 and dielectric layer 12A. The both end portions of the respective through-hole electrodes 18 and 20 are exposed on the front and back surfaces of the dielectric body 12, where each of them connects to a first terminal electrode 22 and a second terminal electrode 24. Note that the internal 14 and 16 and the through-hole electrodes 18 and 20 are composed, for example, of a nickel group metal. A material of the terminal electrodes 22 and may be any as far as it is a conductive material and is not particularly limited.

Figure 1:
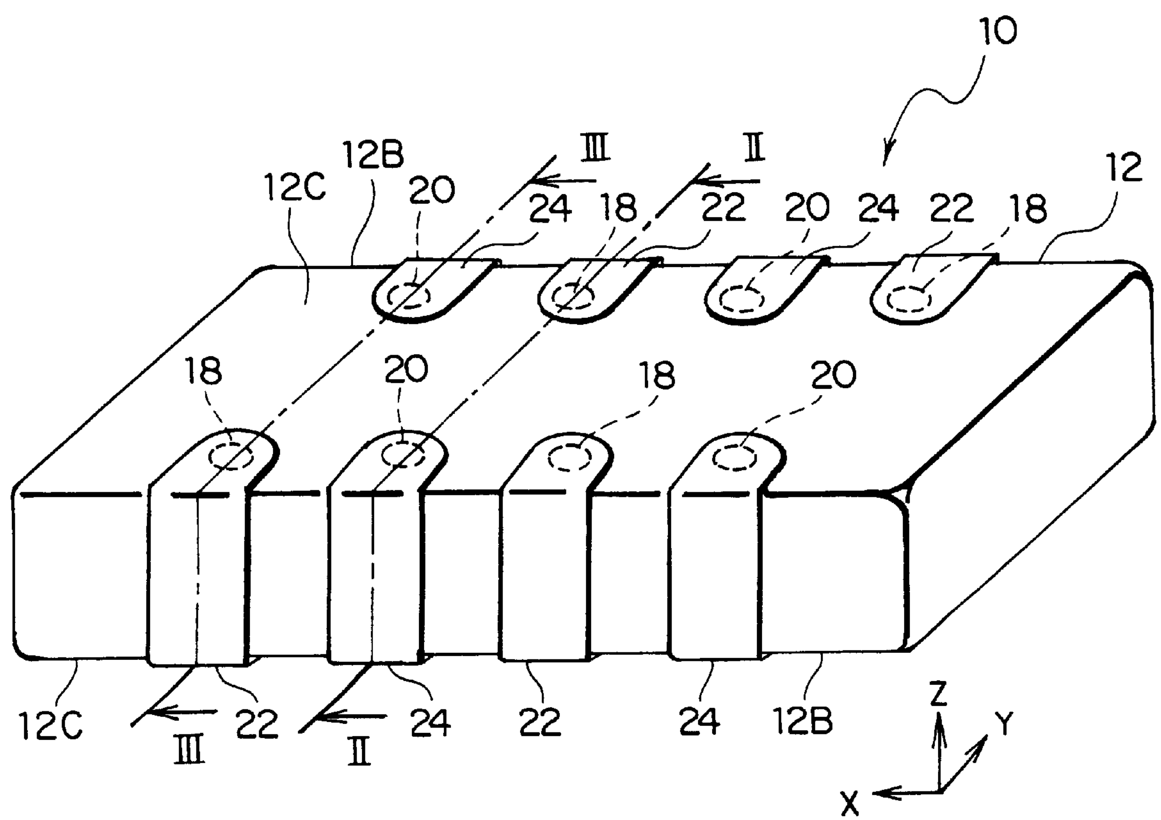
FIG. 1 is a perspective view of a multiterminal multilayer capacitor according to a first embodiment of the present invention.
Figure 2:
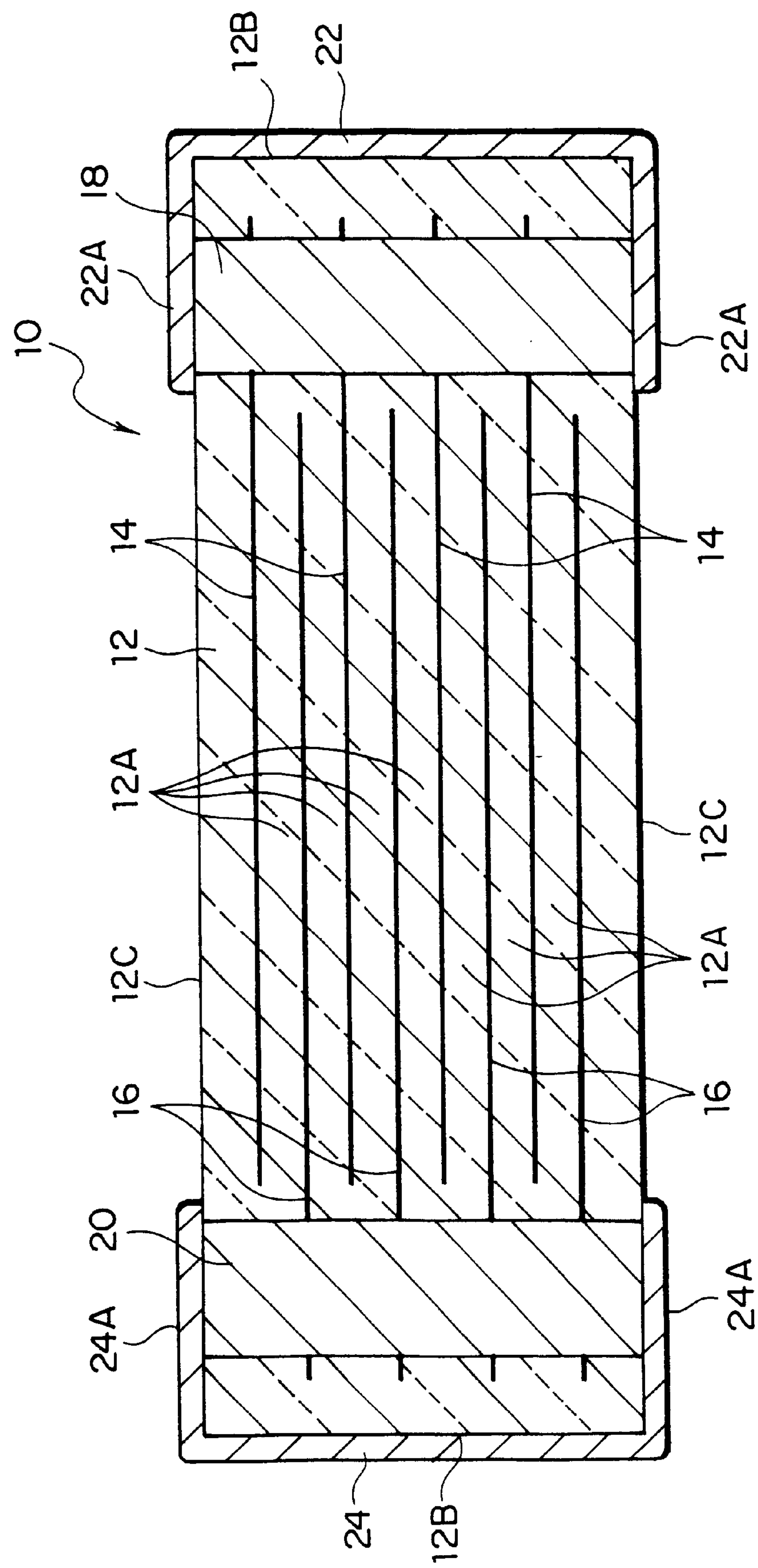
FIG. 2 is a sectional view along the line II—II in FIG. 1.
Figure 3:
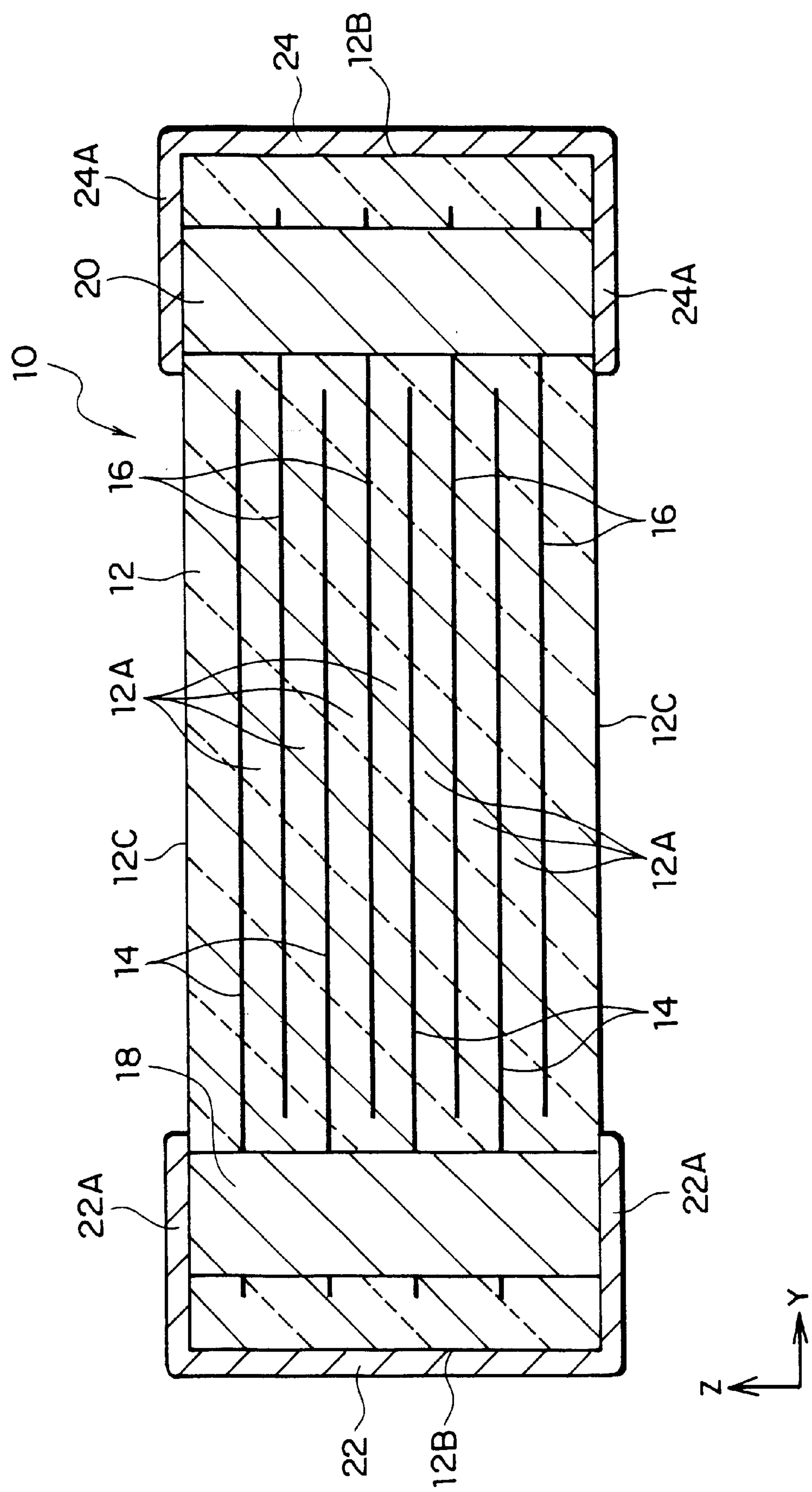
FIG. 3 is a sectional view along the line III—III in FIG. 1.

In the present embodiment, as shown in FIG. 1, respective four of the first and second through-hole electrodes 18 and 20 are alternately arranged along the longitudinal direction X at the both sides of the short side direction Y of the dielectric body 12. Also, one of the mutually facing through-hole electrodes along the short side direction Y of the is dielectric body 12 becomes the first through-hole electrode 18, while the other through-hole electrode becomes the second through-hole electrode 20, and they are alternately arranged.

As shown in FIG. 5A, the first internal electrode 14 has a pattern of electrically connecting to all of the first through-hole electrodes 18 and to none of the second through-hole electrodes 20, and has escaping holes 34 at positions where the second through-hole electrode 20 penetrates the dielectric layer 12A. The inside diameter of the escaping hole 34 is larger than the outside diameter of the second through-hole electrode 20 so that the second through-hole electrode 20 and the first internal electrode 14 are surely insulated.

As shown in FIG. 5B, the second internal electrode 16 has a pattern of electrically connecting to all of the second through-hole electrodes 20 and to none of the first through-hole electrodes 18, and has escaping holes 34 at positions where the first through-hole electrode 18 penetrates the dielectric layer 12A. The inside diameter of the escaping hole 34 is larger than the outside diameter of the first through-hole electrode 18 so that the first through-hole electrode 18 and the second internal electrode 16 are surely insulated.

As shown in FIG. 5A and FIG. 5B, the escaping holes 34 are formed at mutually different positions for the first internal electrode 16 and the second internal electrode 18. In the present embodiment, the shape of the escaping hole 34 is a circle partially notched at a position of the long side of each of the internal electrodes. In the present embodiment, the outside diameter of the first through-hole electrode 18 and the second through-hole electrode 20 is preferably 30 $\mu$m to 200 $\mu$m and the inside diameter of the escaping hole 34 is larger than the outside diameter of the through-hole electrodes preferably by about 20 $\mu$m to 200 $\mu$m.

The through-hole electrodes 18 and 20 are arranged near long side positions of the first internal electrode 14 and the second internal electrode 16 in the dielectric body 12, and arranged at positions by which the whole circumference of the through-hole electrode fits in the internal electrode at the connection points with the internal electrodes.

As shown in FIG. 1, the first terminal electrodes 22 and the second terminal electrodes 24 position on mutually facing two sides 12B along the short side direction Y of the body 12 on the outer surface of the dielectric body 12 and alternately arranged along the longitudinal direction X of the body 12. Each of the terminal electrodes 22 or 24 comprises a base part positioned on the side 12B and a terminal pad part bent at a right angle from the base part and positioned on the front and back surfaces 12C of the body 12. The base parts of the electrodes 22 and 24 are arranged substantially parallel to the corresponding through-hole electrodes 18 and 20 and electrically connected to the exposed end portions of the respective through-hole electrodes 18 and 20 at the terminal pad parts. Namely, the first terminal electrode 22 is connected to the first through-hole electrode 18, the second terminal electrode 24 is connected to the second through-hole electrode 20, and the first terminal electrodes 22 and the second terminal electrodes 24 are alternately arranged next to each other on the opposite sides 12B of the dielectric body 12. In the present embodiment, respective four of the terminal electrodes 22 and 24 are arranged on two sides 12B among six planes of the multiterminal multilayer capacitor 10 in a hexahedral shape.

Next, production of the multiterminal multilayer capacitor 10 according to the present embodiment will be explained based on FIG. 6.

Figure 6:
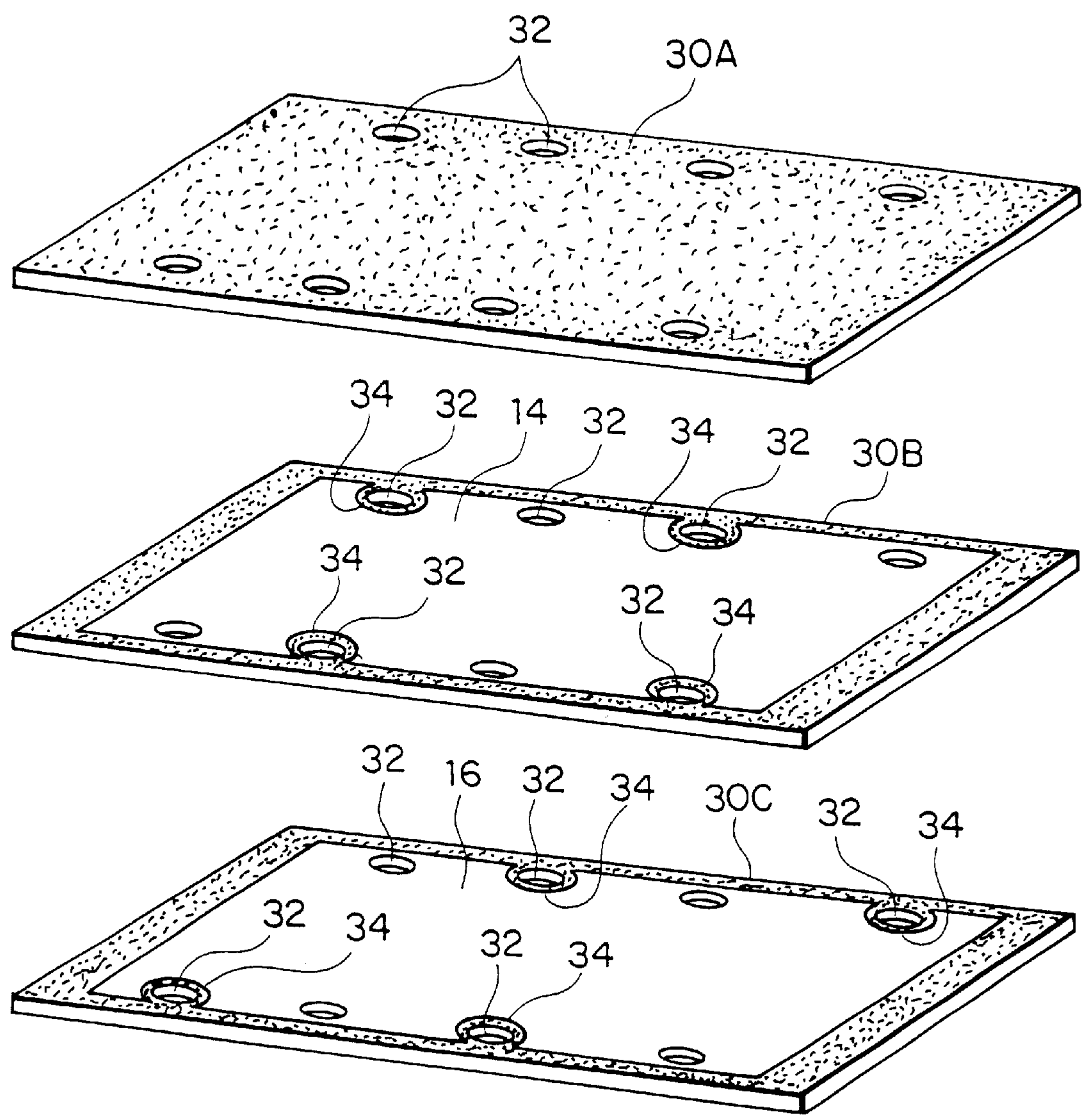
FIG. 6 is a perspective.view of a plurality of ceramic green sheets used in a production process of the multiterminal multilayer capacitor shown in FIG. 1.

First, as shown in FIG. 6, a plurality of ceramic green sheets 30A, 30B and 30C made by a dielectric material for functioning as a capacitor are prepared for the production of the multiterminal multilayer capacitor 10.

The upper surface of the ceramic green sheet 30A shown in FIG. 6 is not printed or spattered any electrodes, while the ceramic green sheet 30B is printed or spattered, for example, with a conductive paste in a pattern of the first internal electrode 14 for forming the first internal electrode 14. Also, the ceramic green sheet 30C is printed or spattered with a conductive paste in a pattern of the second internal electrode 16 for forming the second internal electrode 16 in the same way as the first internal electrode.

The ceramic green sheets 30A, 30B and 30C are provided with 8 through-holes in total arranged in two lines at mutually a same position. The first internal electrode layer 14 formed on one surface of the ceramic green sheet 30B is formed escaping holes 34 alternately in a pattern of forming the second through-hole electrodes 20 shown in FIG. 1 to FIG. 5 so as not to contact the through-holes 32. Also, the internal electrode layer 16 formed on one surface of the ceramic green sheet 30C is formed escaping holes 34 alternately in a pattern of forming the first through-hole electrodes 18 shown in FIG. 1 to FIG. 5 so as not to contact the through-holes 32.

In other words, as shown in FIG. 6, the through-holes 32 positioning second and fourth from the left among through-holes 32 arranged at closer side of the first internal electrodes 14 are formed with escaping holes 34, each of which is coaxial with the through-holes 32 and has a larger diameter than the through-holes 32. Also, the through-holes 32 positioning first and third from the left among through-holes 32 arranged at far side of the first internal electrodes 14 are formed with escaping holes 34, each of which is coaxial with the through-holes 32 and has a larger diameter than the through-holes 32. Furthermore, as shown in FIG. 6, the second internal electrode 16 is formed with escaping holes 34 in the same way as in the above at through-holes 32 located at positions not provided with the escaping holes 34 on the first internal electrode 14.

Then, rectangular ceramic green sheets 30B and 30C are successively stacked. For example, respective four of these sheets are alternately stacked and the upper surface of the stacked respective four of ceramic. green sheets is covered with the blank ceramic green sheet 30A so that the internal electrodes at the uppermost portion are not exposed.

After that, they are co-fired. Consequently, the ceramic green sheets become ceramic layers 12A, the dielectric body 12 is obtained, furthermore, a nickel metal based past is poured into the penetrated through-holes 32, and portions without the escaping holes 34 on the respective internal electrodes 14 and 16 and the paste are connected. As a result, the first through-hole electrodes 18 connected to the first internal electrodes 14 and the second through-hole electrodes 20 connected to the second electrodes 16 are formed in the through-holes 32, respectively.

Finally, first terminal electrodes 22 connected to the first through-hole electrodes 18 and the second terminal electrodes 24 connected to the second through-hole electrodes 20 are arranged around the stacked ceramic green sheets, and the multiterminal multilayer capacitor 10 wherein the terminal electrodes 22 and 24 are arranged respectively on two sides 12B of the dielectric body 12 is obtained. Note that plating processing may be used and a single metal, such as Ag and Cu, may be used when arranging the terminal electrodes 22 and 24 on two sides 12B of the dielectric body 12.

Next, an operation of the multiterminal multilayer capacitor 10 according to the present embodiment will be explained.

In the dielectric body 12 formed by stacking dielectric layers for example made by ceramic, for example, respective four of the flat first internal electrodes 14 and the second internal electrodes 16 are alternately arranged facing to each other separated by the ceramic layers 12A. Also, the first through-hole electrodes 18 connected to the first internal electrodes 14 by penetrating without connecting to the second internal electrodes 16 and the second through-hole electrodes 20 connected to the second internal electrodes 16 by penetrating without connecting to the first internal electrodes 14 respectively extend crossing the internal electrodes 14 and 16.

Furthermore, the first terminal electrodes 22 connected to the first internal electrodes 14 via the first through-hole electrodes 18 and the second terminal electrodes 24 connected to the second internal electrodes 16 via the second through-hole electrodes 20 are arranged next to each other on two sides 12B which are the outside surfaces of the dielectric body 12.

In other words, respective two of the first terminal electrodes 22 and the second terminal electrodes 24 are arranged on one of the sides 12B forming the surface of the dielectric body 12, and on the other side 12B are arranged respective two of the first terminal electrodes 22 and the second terminal electrodes 24 in the same way. Also, the two kinds of through-hole electrodes 18 and 20 connected to either one of the two kinds of internal electrodes 14 and 16 facing to each other are connected to the terminal pad parts 22A and 24A of the terminal electrodes 22 and 24 and extend in a pillar shape along the thickness direction Z of the dielectric body 12. Then, the two kinds of through-hole electrodes 18 and 20 alternately become an anode and a cathode when a current flows and a voltage is applied to the internal electrodes 14 and 16.

Consequently, in the multiterminal multilayer capacitor 10 according to the present embodiment, due to a high frequency current flowing inversely to each other in the two kinds of through-hole electrodes 18 and 20, magnetic fluxes generated in the multiterminal multilayer capacitor 10 are mutually canceled and nullified. As a result, parasitic inductance in the multiterminal multilayer capacitor itself decreases and thereby, equivalent serial inductance also decreases.

Also in the present embodiment, as a result that the internal electrodes 14 and 16 and the terminal electrodes 22 and 24 are connected via the through-hole electrodes 18 in a pillar shape having a large area at the end portion, the through-hole electrodes 18 and 20 and the terminal electrodes 22 and 24 are firmly connected and equivalent serial resistance becomes low. Furthermore, since a plurality of the first internal electrodes 14 and the second internal electrodes 16 are formed and alternately arranged in the dielectric body 12, the multiterminal multilayer capacitance is also capable of obtaining a high electric capacitance.

Also, in the present embodiment, the first through-hole electrode 18 connected to the first internal electrode 14 and the second through-hole electrode 20 connected to the second internal electrode 16 respectively penetrate the dielectric body 12 at positions next to each other. Accordingly, the effect of the present embodiment of mutual cancellation of the magnetic flux by a high frequency current flowing inversely to each other further improves.

Furthermore, in the present embodiment, the dielectric body 12 is in a hexagonal shape, a plurality of first terminal electrodes 22 and second terminal electrodes 24 are arranged next to each other on the mutually opposite two sides 12B of the dielectric body 12. The terminal electrodes 22 and 24 are connected to the respective through-hole electrodes 18 and 20 at portions of the terminal electrodes 22 and 24 bent at the right angle from their base parts extending in parallel with the through-hole electrodes 18 and 20.

Accordingly, the respective terminal electrodes 22 and 24 are made to be alternately an anode and a cathode in the form that polarities of the adjacent terminal electrodes 22 and 24 of the respective sides 12B are mutually different at the time of flowing a high frequency current in the terminal electrodes 22 and 24. As a result, the high frequency current flows from the terminal electrodes 22 and 24 of the two sides 12B to the internal electrodes 14 and 16 inversely to each other, and the magnetic fluxes generated thereby are mutually canceled and parasitic inductance furthermore reduces.

(Second Embodiment)

Next, a multilayer electronic device according to a second embodiment will be explained based on the drawings. Note that the same reference numbers are added to the same components as those explained in the first embodiment and repetition of the explanation will be omitted.

Figure 7:
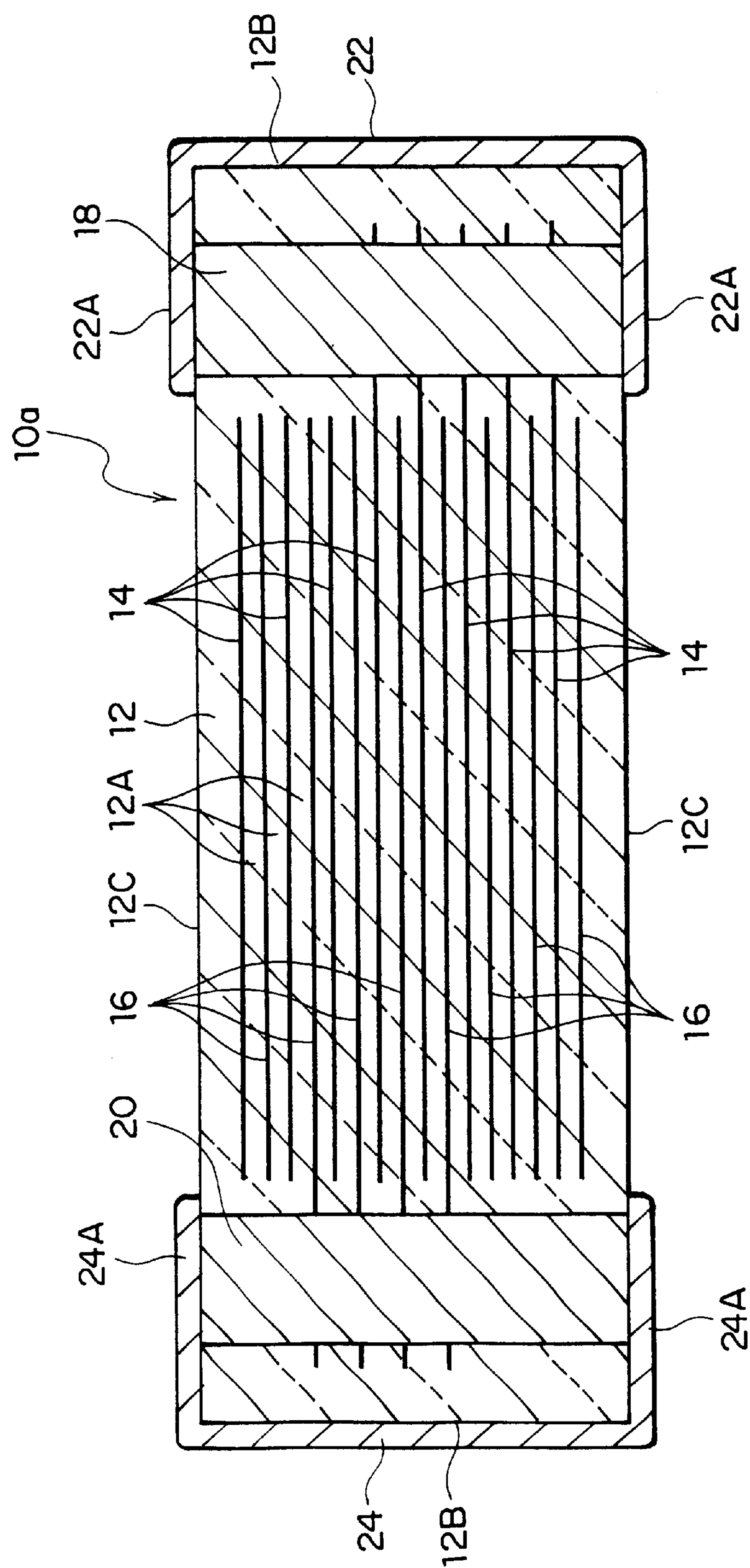
FIG. 7 is a sectional view of a multiterminal multilayer capacitor according to a second embodiment of the present invention.

The multiterminal multilayer capacitor 10*a* according to the present embodiment comprises four first through-hole electrodes 18 and four second through-hole electrodes 20 in the same way as in the capacitor 10 of the first embodiment. Note that in the present embodiment, as shown in FIG. 7 to FIG. 9, a plurality of, for example, total 16 of the first internal electrodes 14 and the second internal electrodes 16 are alternately stacked.

Also, in at least one of the plurality of first internal electrodes 14 arranged in the dielectric body 12, a pattern of escaping holes 34 formed on the first internal electrode 14 is different along the stacking direction of the dielectric layer 12A so as not to be connected to at least one of the plurality of first through-hole electrodes 18. Furthermore, in at least one of the plurality of second internal electrodes 16, a pattern of escaping holes 34 formed on the second internal electrode 16 is different along the stacking direction of the dielectric layer 12A so as not to be connected to at least one of the plurality of second through-hole electrodes 20.

Furthermore, in the present embodiment, the plurality of first internal electrodes 14 arranged in the dielectric body 12 have less number of connection points with the plurality of first through-hole electrodes 18 and more number at the central portion on the both sides along the stacking direction of the dielectric layer 12A. Similarly, the plurality of second internal electrodes 16 have less number of connection points with the plurality of second through-hole electrodes 20 and more number at the central portion on the both sides along the stacking direction of the dielectric layer 12A.

Figure 8:
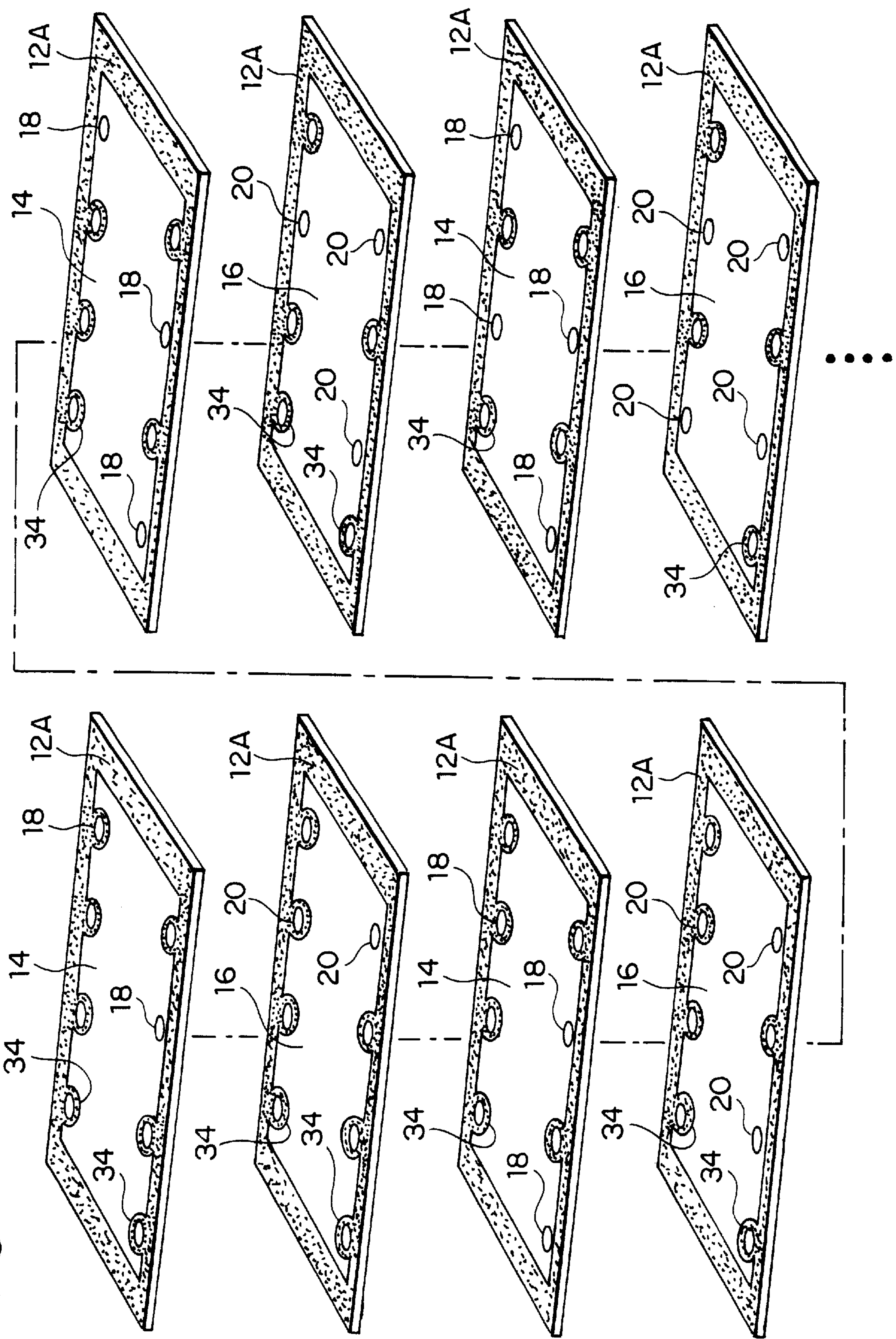
FIG. 8 is a disassembled perspective view of an upper portion of the multiterminal multilayer capacitor shown in FIG. 7.
Figure 9:
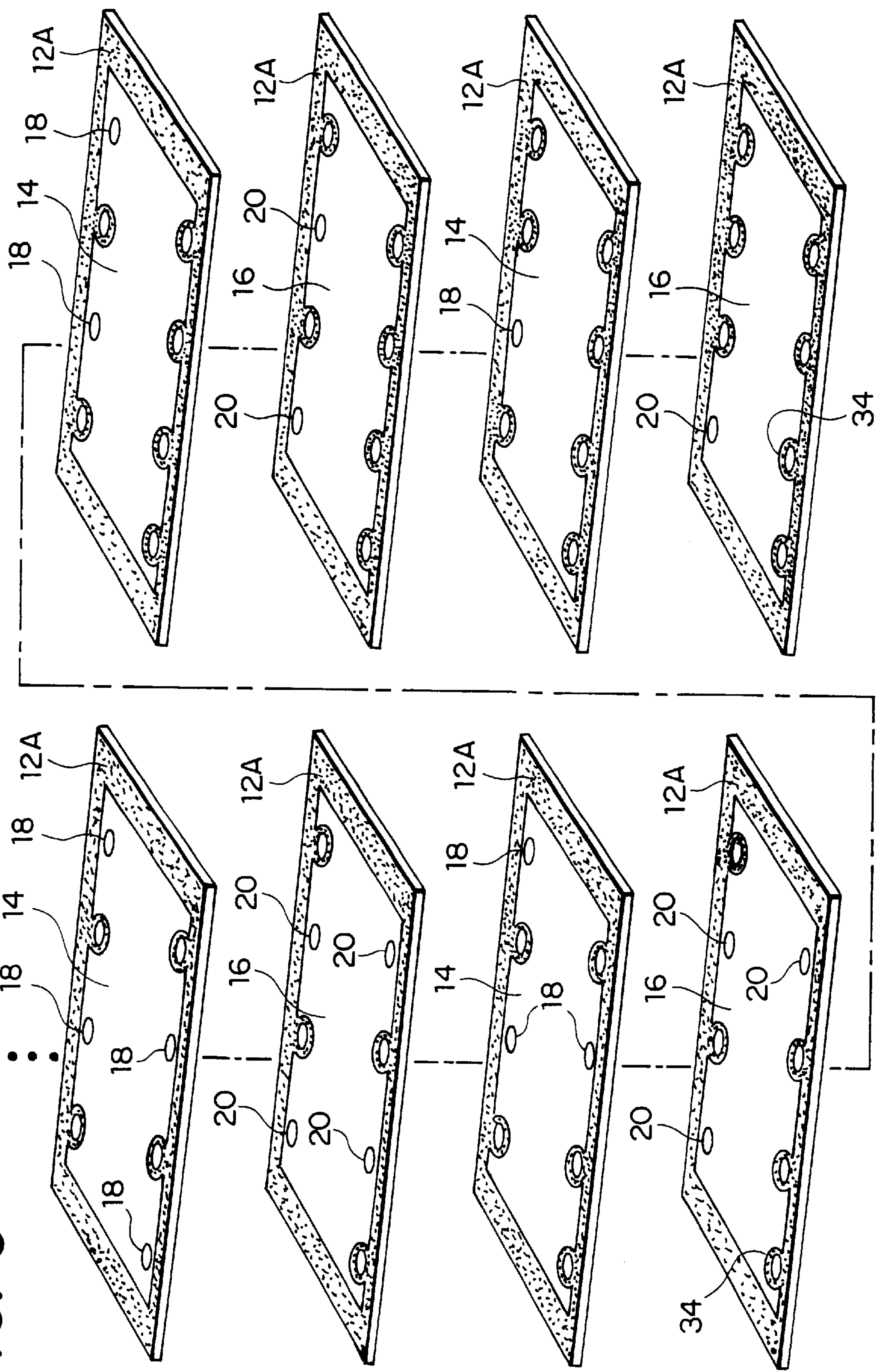
FIG. 9 is a disassembled perspective view of a lower portion of the multiterminal multilayer capacitor shown in FIG. 7.

Specifically, as shown in FIG. 8, seven escaping holes 34 are provided on an uppermost first internal electrode 14 and the second internal electrode 16 positioned at.the second from the top, respectively. As a result, it is connected to the uppermost first internal electrode 14 only by one first through-hole electrode 18 among the four first through-hole electrodes 18. Also, it is connected to the second internal electrode 16 arranged at the second from the top only by one second through-hole electrode 20 among the four second through-hole electrodes 20.

Also, six escaping holes 34 are provided on the first internal electrode 14 positioned at the third from the top and the second internal electrode 16 positioned at the fourth from the top, respectively. Consequently, it is connected to the first internal electrode 14 positioned at the third from the top only by two first through-hole electrodes 18 among the four first through-hole electrodes 18. Also, it is connected to the second internal electrode 16 arranged at the fourth from the top only by two second through-hole electrodes 20 among the four second through-hole electrodes 20.

Furthermore, five escaping holes 34 are provided on the first internal electrode 14 positioned at the fifth from the top and the second internal electrode 16 positioned at the sixth from the top, respectively. Therefore, it is connected to the first internal electrode 14 arranged at the fifth from the top only by three first through-hole electrodes 18 among the four first through-hole electrodes 18. Also, it is connected to the second internal electrode 16 arranged at the sixth from the top only by three second through-hole electrodes 20 among the four second through-hole electrodes 20.

Furthermore, four escaping holes 34 are provided on the first internal electrode 14 positioned at the seventh from the top and the second internal electrode 16 positioned at the eighth from the top, respectively. Therefore, it is connected to the first internal electrode 14 arranged at the seventh from the top by all of the four first through-hole electrodes 18. Also, it is connected to the second internal electrode 16 arranged at the eighth from the top by all of the four second through-hole electrodes 20.

On the other hand, the first internal electrode 14 and the second internal electrode 16 arranged at the ninth and on from the top are connected by all of the four first through-hole electrodes 18 and the four second through-hole electrodes 20 in the same way as the seventh and the eighth ones. As shown in FIG. 9, patterns of forming the escaping holes 34 on the internal electrodes 14 and 16 stacked on the lower half side are the inverse of the patterns of forming the escaping holes 34 on the internal electrodes 14 and 16 stacked on the upper half side shown in FIG. 8.

As explained above, the multiterminal multilayer capacitor 10*a* according to the present embodiment is configured so that the internal electrodes 14 and 16 near the upper and lower surfaces 12C of the body 12 are not connected to a part of the through-hole electrodes 18 and 20. The multiterminal multilayer capacitor 10*a* also brings the same effect of reducing parasitic inductance and reducing equivalent serial inductance, etc. as in the first embodiment.

Note that the present invention is not limited to the above embodiments and a variety of modifications can be made thereon.

For example, the number of internal electrodes were made to be four of each to be eight in total in the first embodiment and eight of each to be sixteen in total in the second embodiment, but the number of the internal electrodes is not limited to those. Also, the number of through-hole electrodes were made to be four of each to be eight in total in the respective embodiments, but the number does not have to be those.

Furthermore, the escaping hole 34 was made to be a partially notched shape, but instead of that, it may be a perfect circle and other shapes. Also, when producing the multiterminal multilayer capacitor 10 or 10*a* according to the above embodiments, through-holes were formed before stacking the green sheets, but the through-holes may be formed after stacking the green sheets.

Furthermore, a multilayer electronic device according to the present invention is not limited to the above explained multiterminal multilayer capacitor, and the present invention may be applied to other electronic devices.

Below, the present invention will be explained based on a further specific example and a comparative example, but the present invention is not limited to these examples.

EXAMPLE 1

A multiterminal multilayer capacitor 10 shown in FIG. 1 to FIG. 6 were actually produced. A shape of the capacitor 10 was a 3216 shape and capacitance of the capacitor was 1 μF. Note that the 3216 shape indicates a size of about 3.2 mm in length and about 1.6 mm in width.

As a result of conducting a test of comparing values of an equivalent serial inductance and an equivalent serial resistance of the multiterminal multilayer capacitor 10, the equivalent serial inductance was 50 pH and the equivalent serial resistance was 3 mΩ.

Comparative Example

Figure 10:
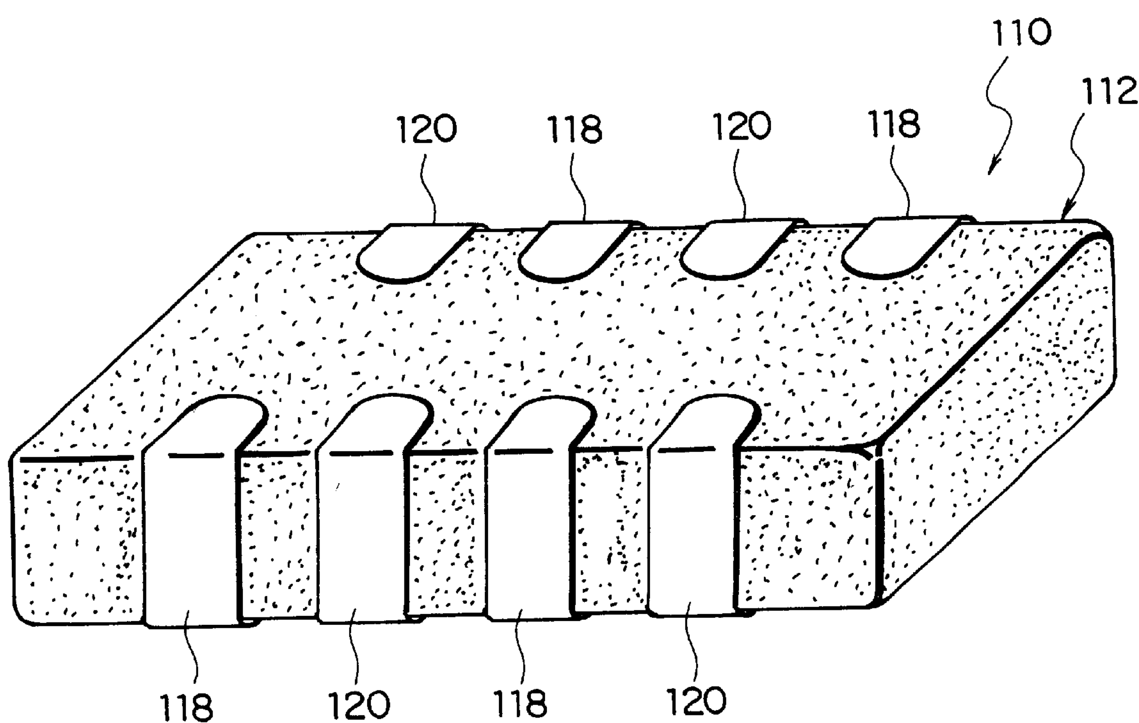
FIG. 10 is a perspective view of a multiterminal multilayer capacitor according to a comparative example of the present invention.
Figure 11:
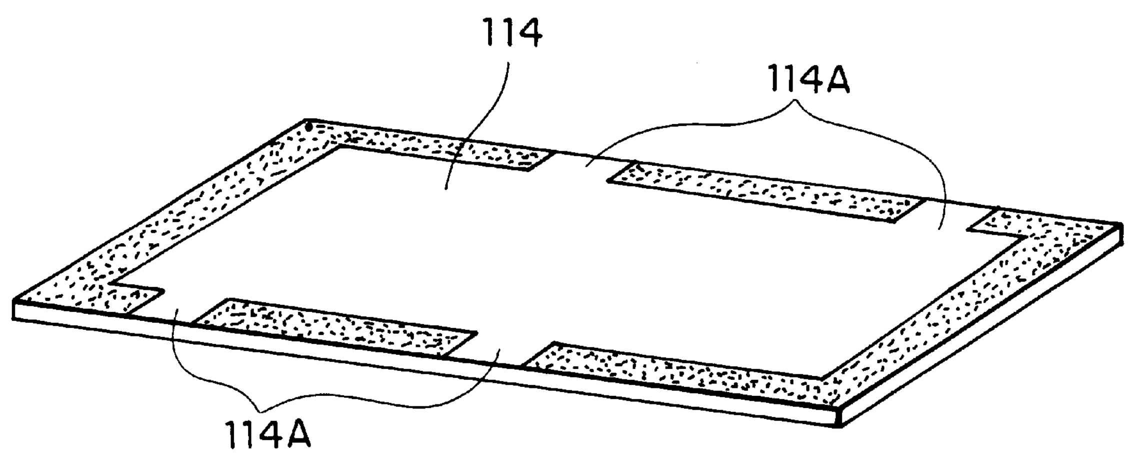
FIG. 11 is a disassembled perspective view of the inside of the multiterminal multilayer capacitor shown in FIG. 10.
Figure 11:
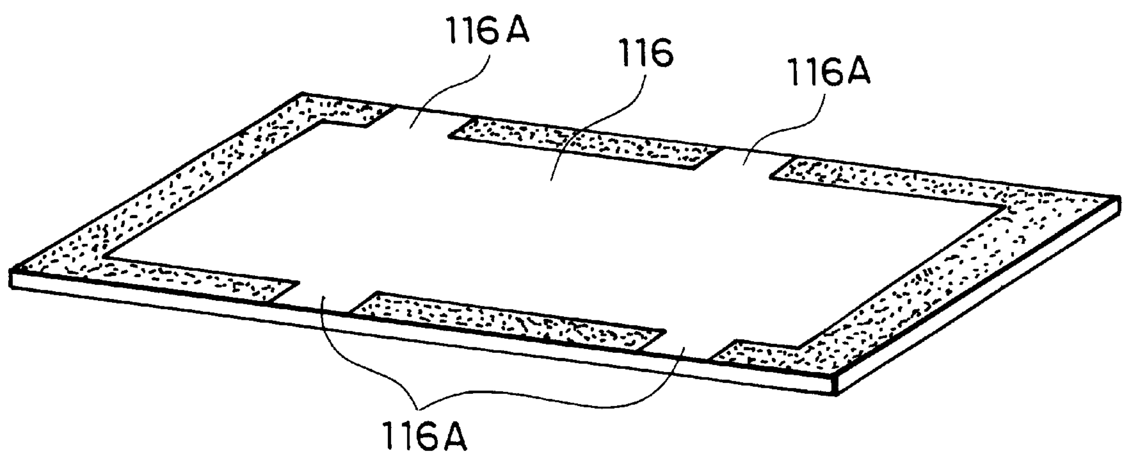

As shown in FIG. 10 and FIG. 11, a multiterminal capacitor 110 corresponding to the related art was actually produced. The capacitor 110 is composed of a multilayer body 112 in a rectangular parallelepiped shape and configured so that four pairs of internal electrodes 114 and 116 shown in FIG. 11 are stacked via ceramic elements.

Draw out portions 114A and 116A to be drawn out to mutually facing two sides among four sides of the stacked body 112 are formed on respective internal electrodes 114 and 116. Also, on mutually facing two sides among the four sides of the stacked body are formed totally eight terminal electrodes 118 and 120, four on each sides, connected to the respective draw out portions 114A and 116A.

A shape of the capacitor 110 was also the 3216 shape in the same way as in the first example, and capacitance of the capacitor was 1 μF.

As a result of conducting a test of comparing values of equivalent serial inductance and equivalent serial resistance of the multiterminal multilayer capacitor 110, the equivalent serial inductance was 111 pH and the equivalent serial resistance was 6 mΩ.

Evaluation

Comparing with the equivalent serial inductance of 111 pH of the capacitor 110 in the comparative example 1, that of the capacitor 10 in the example 1 was 50 pH, which was obviously small. Also, comparing with the equivalent serial resistance of 6 mΩ of the capacitor 110 in the comparative example 1, that of the capacitor 10 of the example 1 was obviously small, 3 mΩ.

What is claimed is:

1. A multilayer electronic device, comprising:

a dielectric body formed by stacking dielectric layers;

a flat first internal electrode arranged in said dielectric body;

a flat second internal electrode arranged opposing to said first internal electrode and insulated via said dielectric layer in the dielectric body;

a first through-hole electrode connected to said first internal electrode by penetrating, penetrating said second internal electrode without connecting thereto and extending across these internal electrodes;

a second through-hole electrode connected to said second internal electrode by penetrating, penetrating said first internal electrode without connecting thereto and extending across these internal electrodes;

a first terminal electrode arranged on an outer surface of said dielectric body and connected to said first through-hole electrode; and a second terminal electrode arranged on the outer surface of said dielectric body and connected to said second through-hole electrode.

2. The multilayer electronic device as set forth in claim 1, characterized in that a plurality of said first internal electrodes and a plurality of said second internal electrodes are respectively formed in said dielectric body; and the first internal electrodes and the second internal electrodes are alternately arranged in said dielectric body.

3. The multilayer electronic device as set forth in claim 2, wherein a plurality of first through-hole electrodes and a plurality of second through-hole electrodes are formed in said dielectric body and said first through-hole electrodes and said second through-hole electrodes are arranged next to each other.

4. The multilayer electronic device as set forth in claim 3, wherein each of said plurality of first through-hole electrodes is connected to all of the first internal electrodes arranged in said dielectric body and each of said plurality of second through-hole electrodes is connected to all of said second internal electrodes arranged in said dielectric body.

5. The multilayer electronic device as set forth in claim 3, wherein at least one of said plurality of first internal electrodes arranged in said dielectric body is not connected to at least one of said plurality of said first through-hole electrodes; and at least one of said plurality of second internal electrodes arranged in said dielectric body is not connected to at least one of said plurality of said second through-hole electrodes.

6. The multilayer electronic device as set forth in claim 5, wherein said plurality of first internal electrodes arranged in said dielectric body have less connection points with said plurality of first through-hole electrodes on both end sides along the stacking direction of said dielectric layers and more connection points at the center portion; and said plurality of second internal electrodes arranged in said dielectric body have less connection points with said plurality of second through-hole electrodes on both end sides along the stacking direction of said dielectric layers and more connection points at the center portion.

7. The multilayer electronic device as set forth in claim 1, wherein said dielectric body is formed to be a hexagonal shape;

at least two facing sides of said dielectric body in the hexagonal shape are provided with base parts of said first and second terminal electrodes in the way of extending in parallel respectively with said first and second through-hole electrodes; and said first and second terminal electrodes are connected respectively to the first and second through-hole electrodes at terminal pad portions bent at a right angle from the base parts of said first and second terminal electrodes.

8. A multilayer electronic device as set forth in claim 3, characterized in that said first terminal electrodes connected respectively to said first through-hole electrodes and said second terminal electrodes connected to said second internal electrodes are arranged next to each other on the outer surface of said dielectric body.

* * * * *